Jan. 27, 1970 H. E. FRYE 3,492,468

DIVISION OF NEGATIVE DIVIDEND EXPRESSED IN TWO'S COMPLEMENT FORM

Filed Sept. 29, 1966 5 Sheets-Sheet 1

INVENTOR
HAROLD E. FRYE

BY Douglas R. McKechnie
ATTORNEY

DVSR SIGN

DVDN SIGN

QUO SIGN

QUOTIENT

CPMNT DVSR

Jan. 27, 1970 H. E. FRYE 3,492,468

DIVISION OF NEGATIVE DIVIDEND EXPRESSED IN TWO'S COMPLEMENT FORM

Filed Sept. 29, 1966 5 Sheets-Sheet 4

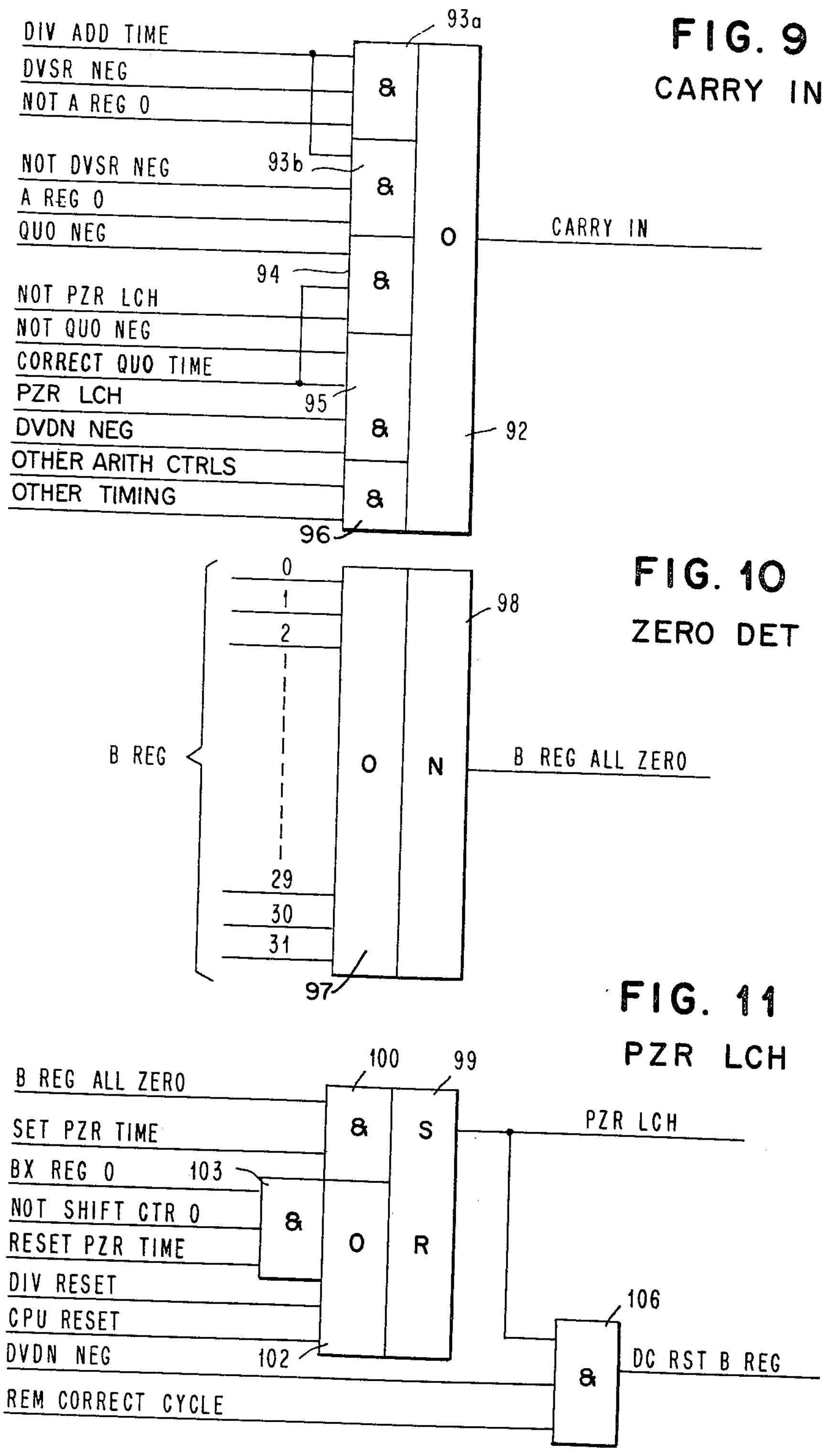
FIG. 9 CARRY IN, FIG. 10 ZERO DET, FIG. 11 PZR LCH

United States Patent Office 3,492,468

Patented Jan. 27, 1970

3,492,468

DIVISION OF NEGATIVE DIVIDEND EXPRESSED IN TWO'S COMPLEMENT FORM

Harold E. Frye, Wappingers Falls, N.Y., assignor to International Business Machines Corporation, Armonk, N.Y., a corporation of New York Filed Sept. 29, 1966, Ser. No. 582,870
Int. Cl. G06f 7/39
U.S. Cl. 235—164 4 Claims

ABSTRACT OF THE DISCLOSURE

A data processing system has an arithmetic unit in which division is performed by a non-restoring method. Negative dividends are expressed in two's complement form and a zero is expressed as positive. With such particular division process, a negative dividend and an iteration that produces a zero remainder does not generate a quotient bit when, in fact, one should be generated. Thus, the final quotient is in error but it can be corrected by the addition of one. A zero detector senses when an iteration produces the zero remainder. A dividend sign detector senses when the dividend is negative. When a zero remainder occurs in conjunction with the negative dividend, the detectors actuate a quotient sign corrector causing a one to be added to the quotient so as to produce the correct result.

BACKGROUND OF THE INVENTION

This invention relates to data processing and more particularly to the division of a negative dividend without the need for developing the complement thereof.

In the data processing art, it is common to perform division by means of successive reduction iterations of subtraction, the divisor being added to or subtracted from successively lower orders of the dividend in each iteration. The reduction is successful when there is no overdraw (without passing through zero). A quotient bit is added to the low order end of a quotient which is developed step by step, for each successive reduction. In binary division involving positive numbers, the divisor is subtracted from the high order end of the dividend, and then the dividend is shifted to the left so as to place the divisor in a position relative thereto which is one order lower than it was previously (in a manner similarly to the way in which decimal division is performed by hand). Since binary division is employed, only one subtraction per shift is required. In the event that the divisor is larger than the value expressed by the related orders of the remainder (or dividend) in its currently shifted position, the result is an overdraw in the sense that it passes through zero. When this occurs, the divisor must be added back to the dividend so as to restore it, and then a quotient bit of zero is inserted into the low end of the quotient. Thereafter, the dividend is again shifted and another attempt is made to subtract the divisor from related orders of the shifted dividend.

An alternative to the above described basic form of binary division occurs in division of the "non-restoring" type. In this case, whenever the divisor is too large to be subtracted so that a zero quotient bit must result, instead of adding the divisor back to the dividend, the dividend is first shifted and then the divisor is added back to the dividend. This is equivalent to adding back one half of the divisor and gives the same result as is obtained by adding back the whole divisor (to restore the dividend), shifting the dividend one order higher, and subtracting the whole divisor therefrom. Non-restoring division, as described, is well-known and is discussed in various texts such as Chapter 5 of Arithmetic Operations in Digital Computers, by R. K. Richards (Van Nostrand, 1955 and subsequent).

Thus, division is achieved by attempting to reduce the dividend to zero by successively subtracting the divisor from successively lower ordered groups of digits of the remainder so as to attempt to reduce the dividend to zero. In modern binary computers, operands are generally expressed as signed integers, and are frequently maintained in two's complement notation such that if a positive integer is involved, it will be expressed in true binary form, and if a negative integer is involved it will be expressed in the two's complement of the true binary form. In addition, at least one current system employs the high order bit of an operand as a sign bit, a positive sign being a zero and a negative sign being a one. This has the advantage that small numbers will have all of the high order positions alike, being either a positive integer having a sign bit of zero and a plurality of leading zeros in high order digital positions, or a negative integer having a sign bit of one and a plurality of leading ones (which result from taking the two's complement of the integer). When dividing a negative dividend (regardless of whether the divisor is positive or negative) it is customary to provide the negative dividend in true form, keeping track of the fact that a negative dividend is involved, and reducing the converted negative dividend appropriately from a positive value toward zero. In order to do this, whenever the negative dividend is expressed in two's complement notation, it is necessary to complement the dividend prior to commencement of the divide iterations. In some data processing systems, the necessity of complementing the dividend may take several machine cycles due not only to the need to invert the dividend which provides the one's complement but also to add a "hot one" into the low order of the inverted dividend so as to provide the true form thereof. The addition of the "hot one" in the low order position of the dividend requires that all the possible carriers be permitted to ripple down through the dividend before the true value of the dividend is known. Thus, a complete arithmetic operation is involved, so that significant hardware and machine operating time are required in order to complement the dividend.

An object of the present invention is to provide improved division of a negative dividend expressed in two's complement notation without the need for converting the dividend to true form.

In accordance with the present invention, whenever division of a negative dividend is indicated, the divide operation proceeds in a completely complementary fashion, such that reduction of the dividend from some negative number toward zero is accomplished in successive negative subtraction iterations. However, the successful reduction of a negative dividend to a zero remainder gives erroneous results due to the fact that in binary subtraction (which is achieved by complement addition), a zero result is arithmetically positive, and therefore reduction to zero from a negative value inherently involves crossing the conceptual line from negative values to positive values. This gives an erroneous indication of an "overdraw," and results in an incorrect quotient bit.

It is therefore a more specific object of the present invention to correct erroneous results obtained by reducing a negative dividend to a zero remainder.

In many data processing systems, a dividend may comprise twice as many orders as the divisor and the quotient, and two registers may be used to represent the dividend at the start of the operation, the dividend being shifted to the left (to successively higher ordered positions) on each iteration, and the quotient being developed in the low order end of the low order register, as orders of the register become available due to the leftward shifting of the dividend. It is difficult to determine when a zero remainder is involved because of the fact that the low order register, which includes some remainder bits, may also include some quotient bits.

Another specific object of the present invention is to provide improved zero remainder detecting means.

In accordance with specific objects of the present invention, the high order digits of a remainder (those digits which are actually used in the subtraction of the divisor from the dividend) are monitored for an all zero condition. Whenever an all zero condition is sensed, a possible zero remainder latch is set. Thereafter, the low order digits of the dividend are continuously monitored as they enter the high order register to see whether or not a digit other than zero enters the high order register from the low order register; if one does, then the possible zero remainder latch is reset and the possible zero remainder is ignored. On the other hand, if no further non-zero digits are entered into the high order remainder register, then it is known that the possible zero remainder is in fact a zero remainder and that the problem of reducing a negative dividend from negative values to zero is recognized. In the event that a negative remainder is successfully reduced to zero, it will give an overdraw indication when in fact there is no overdraw. This is because in the subtraction operation which causes an overdraw, the result is all zero which is positive under the definition of binary addition and subtraction. The divide operation is permitted to proceed, nonetheless, and since an overdraw was previously indicated, there will be a negative value of the divisor added to the remainder. This gives a negative remainder so that successive cycles after the first following the all zero remainder will attempt to restore the dividend to zero by adding positive values thereto, and these attempts will continuously cause the remainder to become closer and closer to zero. After each iteration the remainder is doubled by being shifted to the left; the next iteration will reduce it again by adding the divisor thereto; etc. When the divide iterations are complete, the possible zero remainder latch being ON will cause a correction cycle to change the quotient to a correct value. This is simply achieved by adding a ONE to the low order position of the quotient, due to the fact that the quotient bit derived when the zero remainder occured should have been a one, but will in fact have been a zero, and all subsequent quotient bits (in lower orders) will be ones even though they should be zeros. Thus adding a ONE to the low order position will change all of the low order ones to zeros and a carry from the low order ones will change the zero, which should be a one, to a one.

The invention thus permits performing division with a negative dividend without first forming the two's complement of the negative dividend (so as to place it in true form). The only complication is in certain combinations of dividend and divisor which give an all zero remainder; since the all zero remainder is not correctly sensed during the normal divide iterations, a correction cycle is made in those instances when a zero remainder has resulted. The correction cycle is very simply performed by passing the quotient through an adder capable of receiving a hot one so as to increment the quotient by one bit, thus converting it into a correct quotient.

The terms "add" and "addition" hereinafter may be used generically to include subtraction and complement arithmetic.

The foregoing objects, features and advantages of the present invention will become more apparent in the light of the following detailed description of a preferred embodiment thereof, as illustrated in the accompanying drawings, wherein:

FIG. 9 is a simplified schematic block diagram of carry in, or "hot one" circuitry for use in the embodiment of FIG. 1;

FIG. 10 is a simplified schematic block diagram of a zero detector for use in the embodiment of FIG. 1; and FIG. 11 is a simplified schematic block diagram of a possible zero remainder latch circuit for use in the embodiment of FIG. 1.

Figure 1:
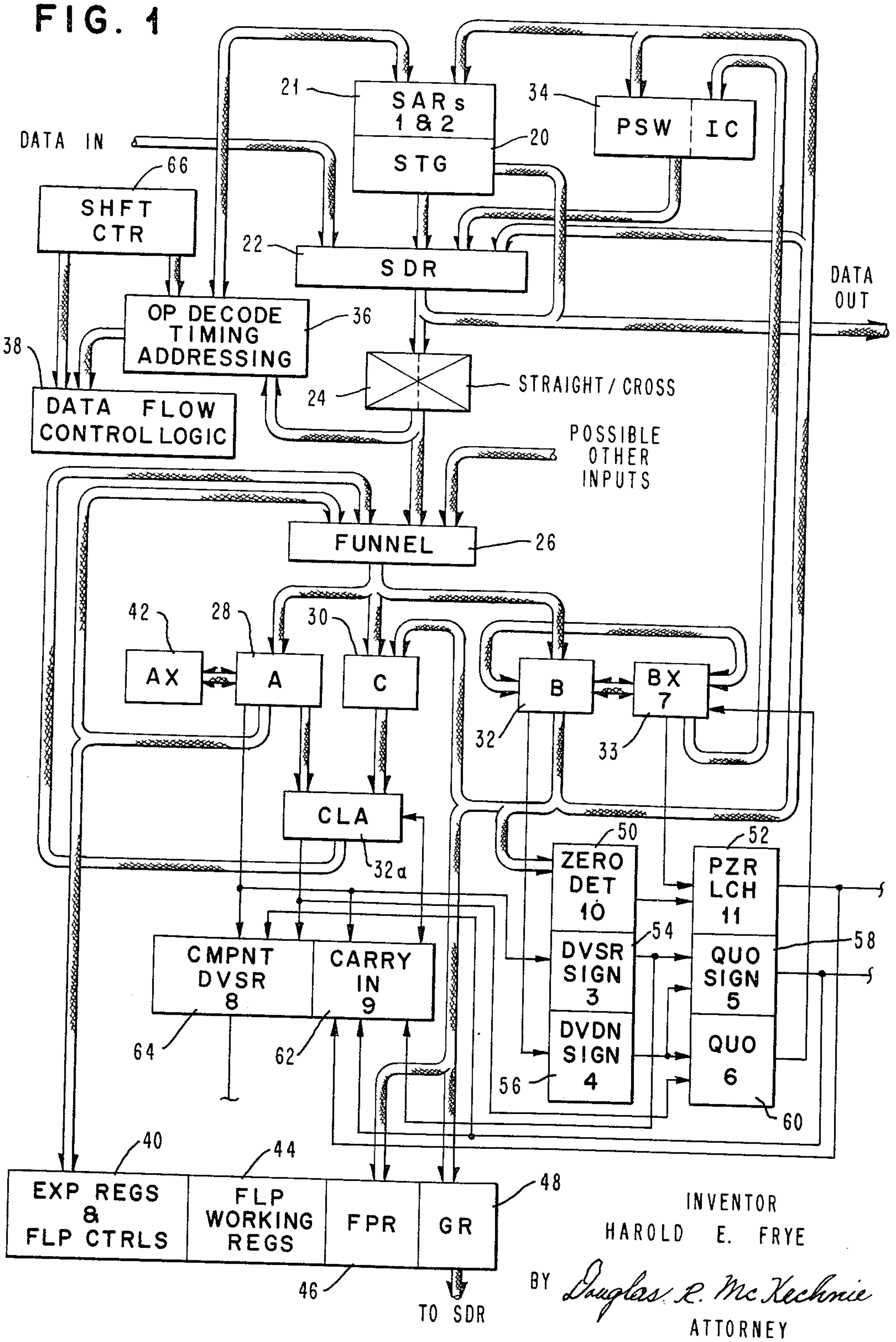
FIG. 1 is a simplified schematic block diagram of the central processing unit of a computer within which the present invention may be embodied.

The present invention is concerned with but a small facet of a well-known process of non-restoring binary division. The invention herein relates particularly to use of negative dividends in the complement form, without the need for first converting the dividend into true form in order to perform the divide operation. The hardware utilized for performing the well-known steps of division is illustrated generally herein in order to set the framework for the present invention. There are many types of computers available and well-known today within which binary division is performed by means of successive complement add iterations and any of these may form a suitable environment for application of the present invention. Therefore, the description herein is limited to a detailed description of the theory involved, including the basic arithmetic processes and the improvements relating to the present invention, together with exemplary circuitry for generating the special control signals which are illustrative of means for implementing the present invention in any of the well-known binary divider embodiments.

BASIC THEORY OF BINARY ARITHMETIC

In order to develop a complete understanding of the origin of the problem which the present invention overcomes, it is necessary to have in mind certain of the basic characteristics of binary arithmetic. Considering the most basic rudiments of binary addition, Table 1 illustrates that adding one and one yields a result of two, where two is expressed as a zero in the first order (two-to-the-zero-power column) and a one in the second order (two-to-the-first-power column). This may alternately be referred to as a zero with a carry insofar as the lowest order is concerned.

TABLE 1

| | |
|---|---|
| 1 | =00001 |
| +1 | =00001 |
| 2 | =00010 |

An example of the direct subtraction of two binary numbers is illustrated in Table 2. The same result can be achieved by complement addition. This involves forming the two's complement of the subtrahend and adding that to the minuend so as to generate the difference. The two's complement is formed by inverting the subtrahend and adding a one (called a "hot one") in the low order position thereof, as illustrated in Table 3, then the two's complement of the subtrahend is added to the minuend as illustrated in Table 4.

TABLE 2

| | |
|---|---|
| 9= | 01001 |
| −6= | −00110 |
| 3= | 00011 |

TABLE 3

| | |
|---|---|
| 1's complement 6= | 11001 |
| add Hot 1 = | 1 |
| 2's complement 6= | 11010 |

TABLE 4

| | |
|---|---|
| 01001= | 9 |
| +11010= | 2's complement 6 |
| C00011= | 3 (carry indicates positive result) |

Notice that the result (plus 3) is greater than zero, and this is indicated by the presence of a carry out of the high order position of the adder as indicated in Table 4. This is shown in illustration *a* of FIG. 2. If on the other hand, nine had been subtracted from six, a negative difference would have resulted and this would be indicated by the lack of a carry as shown in Table 5 and in illustration *c* of FIG. 2.

TABLE 5

| | |
|---|---|
| 6= | 00110 |
| −9= | 10111 |
| −3= | 11101 (no carry indicates negative result) |

Figure 2:
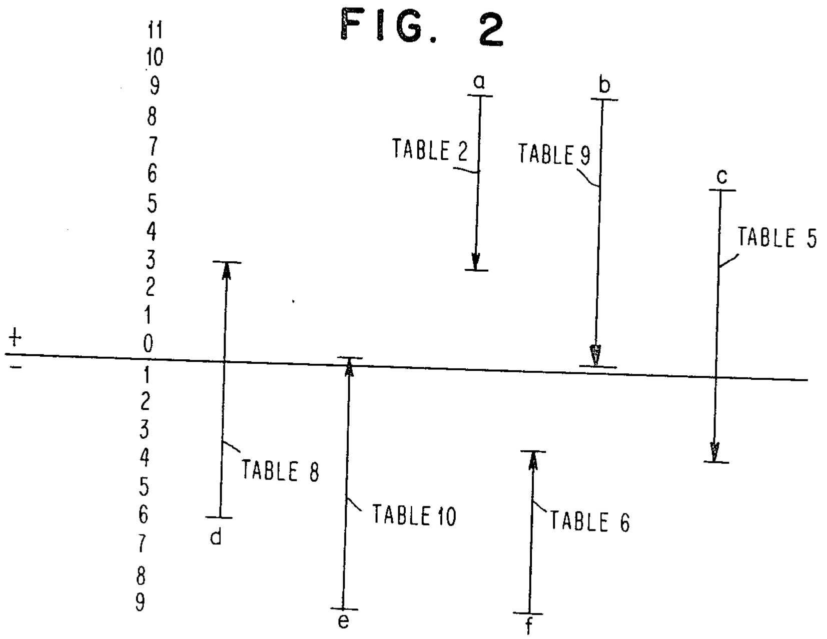
FIG. 2 is a symbolic diagram of mathematical reductions used in the process of division.

It is also possible to reduce a negative number by adding thereto a positive number as shown in Table 6 and in illustration *f* of FIG. 2. Thus adding plus 6 to minus 9 produces a result of minus 3, and the fact that the result is negative is indicated by the lack of a carry at the output of the adder. In order to get the three into true form (if desired for some reason) it would have to be complemented as shown in Table 7 and illustration *f* of FIG. 2 wherein the difference is first inverted and then has a "hot one" added to the low order thereof so as to first provide the one's complement and then convert that to the two's complement, which is plus three.

TABLE 6

| | |
|---|---|
| −9= | 10111 |
| +6= | 00110 |
| −3= | 11101=2's complement of 3 (no carry indicates negative result) |

TABLE 7

| | |
|---|---|
| 00010= | invrt of −3 |
| 1= | add Hot 1 |
| 00011= | 3 (no carry indicates negative result) |

If on the other hand, a negative number has added thereto a larger positive number, then a positive result is achieved as indicated in Table 8 and illustration *d* of FIG. 2.

TABLE 8

| | |
|---|---|
| −6= | 11010 |
| +9= | 01001 |
| +3= | C00011 (carry indicates positive result) |

The phenomenon to which the present invention is most particularly directed is illustrated in Table 9 and 10. Table 9 illustrates that when nine is subtracted from nine (or any other positive number is subtracted from itself) an all zero result is accompanied with a carry and the carry indicates a positive result (as is true with the examples shown in Tables 4 and 8 hereinbefore). This is shown in illustration *b* of FIG. 2. On the other hand, if a negative number has added thereto a positive number the same result is achieved as indicated in Table 10 and in illustration *e* of FIG. 2. It is thus seen that if a dividend of nine is reduced by a divisor of nine a result of zero will be achieved, the zero being indicated as positive. Similarly, if a dividend of minus nine is reduced with a plus nine, a zero result is also indicated as positive. However, a positive result in a divide operation wherein the dividend is negative is an overdraw, or an unsuccessful subtraction so that no quotient bit should be generated. In fact though, a successful reduction to zero as indicated in Table 10 should result in a generating a quotient bit. It is for this reason that division of a complement dividend has not heretofore been readily achieved.

TABLE 9

| | |
|---|---|
| 9= | 01001 |
| −9= | 10111 |
| 0= | C00000 (carry indicates positive result) |

TABLE 10

| | |
|---|---|
| −9= | 10111 |
| +9= | 01001 |
| 0= | C00000 (carry indicates positive result) |

THEORY OF NON-RESTORING BINARY DIVISION

The theory of non-restoring binary division is well-known, and since it is fully described in the aforementioned Richards book, further description here is believed to be unwarranted. However, in order to set forth the differences between positive and negative dividends, and therefore establish a framework for the discussion of the present invention, several examples of binary division are set forth in Tables 11–14, hereinafter, In order to assist the understanding of the examples set forth in the tables, certain rules will be developed.

A first general rule is that non-restoring binary division develops the quotient in true form. Thus when the quotient is to be positive (because both the dividend and the divisor have the same signs) the quotient is developed in the correct sense, and need not be complemented before being returned to storage or otherwise utilized. On the other hand, when the signs of the divisor and dividend are different, then the rules of binary division define the quotient as being negative, and the quotient must be converted from the true notation (which results from the divide operation) to a complement notation prior to being stored or used.

A second rule is that whenever the dividend and divisor have like signs, the divisor is complemented before the first divide iteration is performed. This follows from considerations of binary arithmetic and the nature of the iterations utilized in a divide operation. If the dividend is negative, then in order to reduce it to zero, a true, positive divisor must be added thereto. But if the divisor is also negative, adding it to the dividend will cause the remainder to be still more negative rather than causing it to be closer to zero. If the dividend is positive, then a negative number must be added to it (or a positive number subtracted from it in a complement addition operation). If the divisor is negative when the dividend is positive, then the divisor is in the correct sense so as to be directly added to the dividend to tend to reduce the dividend towards zero. Similarly, if the divisor is positive and the dividend is negative, then they may be added directly together to reach a remainder which is closer to zero than the dividend.

A third rule is that whenever the divisor is negative and there is a carry resulting from the addition operation performed in a given iteration, then the divisor is continued to be used in a negative sense. Similarly, if the divisor is positive and there is no carry, the divisor is continued in the positive sense. However, if the divisor is positive and there is a carry, or if the divisor is negative and there is no carry, then the divisor is complemented before the next iteration. This rule results from the fact that in non-restoring binary division, whenever an overdraw occurs, rather than restoring the remainder prior to shifting it for the next iteration, the remainder is shifted and one half of the divisor is effectively added back in the opposite sense so as to achieve the same result as if the entire divisor is added back and then half of the divisor subsequently subtracted therefrom. This is in accordance with the well-known technique described in the aforementioned Richards book. If an overdraw occurs on a full reduction cycle, there has been too large a reduction of the remainder so that the remainder has crossed the zero line (such as subtracting too large an amount from a positive remainder so as to give a negative result). Similarly, in a combined correction and reduction cycle, which occurs in a cycle following an overdraw, in which the correction for a first iteration is combined with a reduction for a second iteration (as is well-known in non-restoring division), the combined restoration and reduction is achieved by adding back to a remainder which is on the wrong side of zero an amount which brings the remainder back to the correct side of zero, and so the next reduction cycle must be in the opposite direction so as to again be directed towards zero. As an example, if a positive dividend has been reduced by too large an amount so as to give a negative remainder in a first cycle, it is restored and reduced in a second cycle by applying a positive value thereto so as to return it to some positive value which is less than the original positive dividend before the first cycle. The third cycle therefore requires that a negative value be applied to this third remainder so as to tend to draw it closer to zero. Thus the polarity or sense of the divisor must be inverted following a successful combined correction and reduction cycle.

A fourth rule is that a quotient bit is developed whenever a successful reduction toward zero takes place. The reduction is successful when the remainder has the same sign as the dividend. In other words, starting with a positive dividend, any cycle which results in a positive remainder has appropriately reduced the remainder without going too far and causing an overdraw. Similarly, a negative dividend is successfully reduced towards zero when there is a negative remainder. Thus, a quotient bit is developed when the remainder is of the same polarity or sense as the original dividend. Referring back to Tables 1–10, it is seen that starting with a negative dividend, the absence of a carry out of the high order end of the adder in a cycle indicates that the remainder is negative and that therefore a quotient bit should result. On the other hand, when the dividend is positive, a positive remainder indicates that a quotient bit should be developed; this is determined by the presence of a carry out of the high order end of the adder. Thus, the quotient bit may be obtained by forming the logical AND of the dividend sign and a carry in cases where the negative sign is a binary one and the positive sign is a binary zero. Such is the case in the examples illustrated hereinafter.

A fifth rule is that the remainder following the last divide iteration must be corrected when the last divide iteration involves an overdraw, or failed to correct a previous overdraw. Since an overdraw is involved, a true remainder is not expressed unless the remainder is restored to the last value it had following a successful reduction. This is achieved following a simple overdraw by complementing the divisor, and restoring. It is achieved when an attempted restoration is inadequate by performing a correction cycle which is identical to the last divide cycle except for the fact that the remainder is not shifted prior to the performance of this cycle. This is in accordance with the non-restoring division techniques well-known in the art.

A sixth rule applies to cases wherein the dividend has a greater number of orders than the permissible quotient. In such cases, the divisor cannot bear a relationship to the dividend which will result in a quotient larger than the maximum size quotient that can be developed in a given embodiment. For instance, in the examples given in Tables 11–14, a ten bit dividend is divided by a five bit divisor so as to achieve a five bit quotient. If all of the data bits of the dividend are ones (or the complement equivalent thereof for a negative number) and the divisor is a very low number (such as a decimal value of 1, 2, or 3) then the quotient cannot be expressed with only five orders. The maximum decimal value for a dividend in this system which can result in a meaningful five order quotient is tested by a first subtraction cycle in which the quotient is tested to determine only if a quotient bit is developed. The quotient bit is not used in the final quotient since it is always zero except in the case where it is impossible to perform the indicated division due to the fact that the dividend is too large relative to the divisor to permit expression of the quotient in the five orders provided. Thus, the first cycle is a test cycle, and following that, a shift of the remainder takes place and the useful divide iterations may be performed. In many cases, even the second divide iteration should result in a zero quotient bit in order for the quotient to be meaningful; however the present invention is not concerned therewith, and no further discussion is believed warranted.

Table 11 illustrates division of a positive dividend by a positive divisor. In order to illustrate the zero remainder problem which results in an erroneous quotient, the values equivalent to decimal 24 and decimal 3 have been chosen to provide the zero remainder midway through the dividing process, as illustrated in Table 11. Recalling the rules described hereinbefore, since both the dividend and divisor are positive, the divisor is complemented before the first cycle and therefore is negative at the start of cycle 5. The cycle numbers (0–5) indicate the setting of a shift counter or other iteration controller during the current cycle. Iteration division is illustrated in copending applications of Olin L. MacSorley et al., Ser. No. 445,326, filed on Apr. 5, 1965, entitled Large Scale Data

TABLE 11: +24÷+3=+8

| | DVSR | C OUT | B | BX |
|---|---|---|---|---|
| | | | 00000 | 11000 |
| 5 | − | | 11101 | |
| | | 0 | 11101 | 11000 |
| | | | 11011 | 1000* |
| 4 | + | | 00011 | |
| | | 0 | 11110 | 10000 |
| | | | 11101 | 0000* |
| 3 | + | | 00011 | |
| | | 1 | 00000 | 00001 |
| | | | 00000 | 0001* |
| 2 | − | | 11101 | |
| | | 0 | 11101 | 00010 |
| | | | 11010 | 0010* |
| 1 | + | | 00011 | |
| | | 0 | 11101 | 00100 |
| | | | 11010 | 0100* |
| 0 | + | | 00011 | |
| | | 0 | 11101 | 01000 |
| | | | 11101 | 01000 |
| R | + | | 00011 | |
| R, Q | | 1 | 00000 | 01000 |

Processing System, now abandoned in favor of continuation-in-part application Ser. No. 609,238, filed Jan. 13, 1967 and G. M. Amdahl et al., Ser. No. 357,372, filed on Apr. 6, 1964, entitled Data Processing System, now Patent 3,400,731 both assigned to the same assignee as the present invention. Suitable controls are provided in accordance with the art to decrement the shift counter or other iteration control either at the end of one cycle or at the beginning of the next so as to count the number of division steps which are required, and to determine when the dividing operation is complete. Basically, one cycle is required for each order of the divisor. When the dividend has more orders than the permissible quotient, an additional cycle is required in accordance with rule six, hereinbefore, in order to test the relative magnitudes of dividend and divisor to be sure that the quotient can be expressed in the number of orders allocated thereto. In this case, cycle 5 is a test cycle and since it results in no carry out, with a positive dividend, there is no quotient bit developed, so the test is successful and the divide operation may proceed. Since there is no carry developed in cycle 5, there must have been an overdraw. Thus, a combined correction and reduction cycle is indicated for cycle 4. The divisor is complemented so as to be once again in its true form and a second addition is performed. In this case no carry is developed so that the overdraw was not fully corrected even with the subsequent reduction. In other words, a negative balance is still indicated at the end of cycle 4; this being so, the dividend must again be applied in the same sense so as to attempt to return the remainder to the positive side. Thus the dividend is not inverted between cycle 4 and cycle 3. However, in cycle 3, the combined correction and reduction cycle is successful, as is indicated by the positive result designated by a carry out of the high order end of the adder. This indicates that a quotient is to be developed, and since the combined correction and reduction cycle is successful, it means that the direction of operation has to be reversed so that the divisor is again complemented before use in cycle 2. Notice that in cycle 3 an all zero remainder has resulted. This can be seen in Table 11 because the contents of the B and BX registers are displayed, and those bits at the low order end of the BX register which represent developed quotient bits are underscored. The remainder therefore includes all of the contents of the B register and the three high order bits of the BX register at the end of cycle 3. Since these are all zeros, it can be determined that the divide operation is complete. However, it has been found in accordance with the general development of the art that the apparatus required to discern between dividend and quotient bits in the same register is too complex to be effectively used in determining an all zero result so as to terminate a divide operation. Rather the divide operation will proceed, and by providing a correction for the remainder in accordance with the fifth rule, hereinbefore, the correct result will be achieved. The reason for this is, continued attempts to reduce and restore the dividend will cause the remainder to first become negative as a result of an overdraw, but each subsequent cycle will then add back half of the divisor so that a single restoration of the remainder at the end of the divide operation will provide a correct remainder of zero as indicated in the remainder correction cycle (R) at the bottom of Table 11. By comparing cycle 0 with cycle R in Table 11, it is seen that the cycle 0 operation is repeated in cycle R except for the fact that there is no shift of the remainder at the start of the remainder correction cycle. This reduces the remainder to zero in any case where there was previously an all zero remainder. In a different example, where the remainder is non zero, it will similarly be found that a remainder correction cycle, as stated in the fifth rule, will result in the correct remainder. Whenever a quotient bit is successfully developed in cycle 0, no correction of the remainder is required, unless the dividend is negative, and the remainder should be zero, in which case the register containing the remainder is simply DC reset to the all zero state.

Table 12 illustrates a similar example except that the divisor is negative. By comparing Table 12 with Table 11, it can be seen that the divide operation is identical in each case except for the fact that, since the quotient is to be negative (due to the signs of the dividend and divisor being opposite), a quotient complementing cycle is taken after the remainder correction cycle so as to put the quotient into the two's complement notation in which it correctly equals a negative value.

Table 13 illustrates a negative dividend and a positive divisor. Notice that the B and BX registers contain the dividend in its two's complement form, thus expressing it as a negative integer. Similarly, the divisor is expressed in true form thus presenting it as a positive integer. Since the signs are unlike, there is no need to complement the divisor before beginning the divide operation. The first two cycles (cycles 5 and 4) of the Table 13 are exactly the complement of the operations in cycles 5 and 4 of Table 12, except that the quotient bit is developed in a complementary sense, so that the same quotient bit (zero) is developed in cycle 4 in both instances.

In cycle 3, however the operation of Table 13 involving a negative dividend provides an all zero result in the positive sense,

TABLE 12: +24÷−3=≈8

| | DVSR | C OUT | B | BX |
|---|---|---|---|---|
| 5 | − | | 00000<br>11101 | 11000 |
| | | 0 | 11101 | 11000 |
| 4 | + | | 11011<br>00011 | 1000* |
| | | 0 | 11110 | 10000 |
| 3 | + | | 11101<br>00011 | 0000* |
| | | 1 | 00000 | 00001 |
| 2 | − | | 00000<br>11101 | 0001* |
| | | 0 | 11101 | 00010 |
| 1 | + | | 11010<br>00011 | 0010* |
| | | 0 | 11101 | 00100 |
| 0 | + | | 11010<br>00011 | 0100* |
| | | 0 | 11101 | 01000 |
| R | + | | 11101<br>00011 | 01000 |
| | | 1 | 00000 | 01000 |
| Q CPMNT | | | 00000 | 10111<br>1 |
| R, Q | | | 00000 | 11000 |

and this is indicated as an overdraw so that no quotient bit is developed in cycle 3 within Table 13. However, since the quotient is developed in its true form, the quotient bit should be a one. Thus the problem to which the present invention is directed manifests itself in cylce 3 of the divide example illustrated in Table 13. The divide operation is continued through cycles 2, 1, and 0, and during these cycles the presence of the all zero remainder generating the erroneous bit in cycle 3 is ignored. In cycle 3, the value of the remainder is sensed as being all zeros within that portion of the remainder which can be tested. As described in detail hereinafter, the example given herein relative to the illustrative environment of FIG. 1 contemplates the utilization of the B register as the accumulating register wherein the high order dividend and remainder are contained, and a related BX register is utilized for the low order bits of the dividend and for the development of the quotient. A zero detector on the B register will show that the remainder is all zeros through a significant number of high order positions but will not determine whether the remainder is zeros in the lower positions. In accordance with a specific aspect of this invention, a possible zero remainder latch is set at the end of cycle 3 in response to sensing all zeros in the high order positions of the remainder. In successive cycles (2–0 in Table 13), the high order position of the BX register is monitored to determine whether or not any non-zero digits are carried from the BX register into the B register. If no non-zero digits are carried into the B register, then the possible zero remainder sensed in cycle 3 was in fact a complete zero remainder (as is seen in Table 13) so that the presence of the special case of a negative dividend with an all zero remainder is recognized. In accordance with another aspect of the present invention, it has been

TABLE 13: −24÷+3=−8

| | DVSR | COUT | B | BX |
|---|---|---|---|---|
| | | | 11111 | 01000 |
| 5 | + | | 00011 | |
| | | 1 | 00010 | 01000 |
| | | | 00100 | 1000* |
| 4 | − | | 11101 | |
| | | 1 | 00001 | 10000 |
| | | | 00011 | 0000* |
| 3 | − | | 11101 | |
| | | 1 | 00000 | 00000 |
| | | | 00000 | 0000* |
| 2 | − | | 11101 | |
| | | 0 | 11101 | 00001 |
| | | | 11010 | 0001* |
| 1 | + | | 00011 | |
| | | 0 | 11101 | 00011 |
| | | | 11010 | 0011* |
| 0 | + | | 00011 | 00111 |
| | | 0 | 11101 | 00111 |
| | | | 11101 | |
| R | + | | 00011 | |
| | | 1 | 00000 | 00111 |
| PZR CORR. | | | | 1 |
| | | | 00000 | 01000 |
| Q CPMNT | | | | 10111 |
| | | | | 1 |
| R, Q | | | 00000 | 11000 |

found that the quotient developed following an all zero remainder may be corrected by adding a one into the lowest order bit thereof. This one will be propagated through successive ones, changing each of them to zero causing a carry to the next one which changes it to a zero and finally a carry into the zero bit of the quotient which was erroneously developed at the time that an all zero remainder was obtained. Since the all zero remainder is considered positive, due to the presence of a carry as it is developed, the dividing apparatus in accordance with this method of division considers the all zero result to be a non-successful restore and therefore next attempts again to make the remainder negative by adding a negative divisor thereto. This results in a negative remainder which is in fact equal to the divisor. Subsequent reductions cannot change the sign. The results are always therefore negative and always give a quotient bit of one in the remaining cycles after the all zero result is achieved.

In the example given in Table 13, since the dividend and divisor have opposite signs, the quotient is defined to be a negative integer. Even though the dividend is negative, and therefore, the entire divide operation is performed in a complementary fashion, the divisor is nontheless automatically generated in true form, according to the fifth rule, hereinbefore. Thus, a quotient complementing cycle is required in order to express the quotient in the correct format in accordance with its sign. The quotient complementing and quotient correcting functions can be combined, as described hereinafter.

Table 14 illustrates the case when both the divided and the divisor are negative. This case is exactly the same as that illustrated in Table 13 with the exception of the fact that since a positive quotient is defined because the

TABLE 14: −24÷−3=+8

| | DVSR | C OUT | B | BX |
|---|---|---|---|---|
| | | | 11111 | 01000 |
| 5 | + | | 00011 | |
| | | 1 | 00010 | 01000 |
| | | | 00100 | 1000* |
| 4 | − | | 11101 | |
| | | 1 | 00001 | 10000 |
| | | | 00011 | 0000* |
| 3 | − | | 11101 | |
| | | 1 | 00000 | 00000 |
| | | | 00000 | 0000* |
| 2 | − | | 11101 | |
| | | 0 | 11101 | 00001 |
| | | | 11010 | 0001* |
| 1 | + | | 00011 | |
| | | 0 | 11101 | 00011 |
| | | | 11010 | 0011* |
| 0 | + | | 00011 | |
| | | 0 | 11101 | 00111 |
| | | | 11101 | |
| R | + | | 00011 | 00111 |
| | | 1 | 00000 | 00111 |
| PZR CORR. | | | | 1 |
| | | | 00000 | 01000 |

divisor and dividend have the same signs, the quotient need not be complemented in order to present it in true form before it is stored or utilized for other purposes. In Table 14, the same possible zero remainder is generated in cycle 3, and all the remaining iterations are the same in Table 14 as they are in Table 13.

From examination of the examples given in Tables 11–14 and the preceding discussions, it is apparent that any regular binary divide operation may incorporate the present invention, whether or not it utilizes division of the non-restoring type. Division of the non-restoring type merely saves a cycle in each case where there is an overdraw by combining a subsequent reduction with a current restoring cycle. This has nothing to do with the fact that a zero remainder, in the case of a negative dividend, generates a wrong quotient bit, to which the present invention is directed.

The present invention may be incorporated in any suitable divided apparatus merely by providing means to sense any remainder which is all zeros, and means to correct the quotient at the completion of the divide operation in the case where an all zero remainder has been sensed and the dividend is negative. The cycle in which the all zero remainder is developed is immaterial to the present invention, due to the fact that the method of correction automatically ripples a "Hot one" through erroneous low order ones, changing them to zeros and causing a carry from the last of the erroneous ones into an erroneous zero, thereby changing it to a one.

Although the illustrations and Tables 11–14 contemplate the situation where the quotient is developed in low order bits of a register out of which remainder and dividend bits are shifted, the invention is obviously applicable in a case where the quotient may be developed in a different register.

Illustrative of apparatus within which the present invention may be embodied, and of apparatus for performing the sensing and correcting functions of the division of a negative dividend without the complementing thereof, in accordance with the present invention, is a system shown briefly in FIG. 1. FIG. 1 illustrates the main data flow of a central processing unit of the type disclosed in a copending application of the same assignee entitled Integrated Data Processing Apparatus, Ser. No. 582,766, filed on Sept. 28, 1966, by William McGovern et al.

The system set forth in said copending application to McGovern et al. includes a 32-bit data flow, which is equivalent to one data word as defined in said copending applications of Amdahl et al. and MacSorley et al. The system of said McGovern et al. application includes a storage device 20 (STG) which may be operated by appropriate associated storage address registers 21 (SAR 1, SAR 2). The storage 20 feeds a storage data register 22 (SDR) which in turn passes data to a STRAIGHT/CROSS mechanism 24 (which is referred to sometimes hereinafter by the abbreviated term "S/C"). The STRAIGHT/CROSS mechanism 24 feeds data to a FUNNEL 26 which in turn feeds the A, B, and C registers 28, 30, 32. The A and C registers 28, 30 feed a carry look ahead mechanism **32*a* (CLA), the output of which is returned to the FUNNEL 26. The output of the B register 32 is applied to the storage data register 22, the SAR's 21, and to a program status word register 34 (PSW) which includes an instruction counter portion (IC) that is set by a BX register 33. The storage data register 22 is also responsive to the PSW register 34 and to data coming into the central processing unit over a DATA IN bus. The storage data register can apply data manifestations to the storage 20** and to remote parts of the system over a DATA OUT bus.

For clarity in presenting the invention, general control of the system has been simplified because the exact nature of the particular control system used is not germane to the present invention, any control configuration capable of sequencing the operation of the central processing unit being acceptable for use herewith. The usual form of operation decoding, timing, and addressing are required as is shown in block form at 36 in FIG. 1. Additionally, exemplary controls for the system are illustrated by data flow control logic 38.

The output of the A register 28 is also applied to the FUNNEL 26 and to exponent registers and floating point arithmetic controls 40. The A register is additionally in a data transfer relationship with an AX register 42 so as to permit transfer of the contents of the A register to the AX register concurrently with transfer of the contents of the AX register to the A register. The floating point circuitry at the bottom of FIG. 1 is further illustrative of floating point working registers 44 and general floating point registers 46 (FPR), all of which is illustrated only briefly inasmuch as it is unconcerned with the embodiment of the present invention. Floating point registers 46 are fed by the output of the B register, as are general purpose registers 48 (GR). The floating point registers and general purpose registers are addressable by the program in accordance with the architectural definition of a data processing system set forth in the aforementioned copending applications of Amdahl et al. and MacSorley et al.

The B and BX registers are arranged for shifting therebetween, including a shift of one bit to the left so as to present the dividend and remainder to successively higher orders, one order at a time. The A register has the capability of being inverted (that is, being put into one's complement form of its original setting) in response to an INVERT A REG signal. The A register may also be reset to an all zeros condition so that it will supply no input to the carry look ahead circuit **32*a*. The C register is in data transfer relationship with the B register, so that the C register may be set to the contents of the B register at the start of each divide iteration cycle in response to a SET B INTO C signal. The carry look ahead circuit 32*a* cooperates with the A and C registers so as to develop carries which may be used in forming a final sum. The B and C registers are capable of performing the EXCLUSIVE OR function for developing half sums, and the carries developed by the carry look ahead mechanism 32*a* may be passed through the funnel 36 and returned to the B register 32** so as to form a final sum in the B register. Thus the B register serves as an accumulator for the divide operations. All of these characteristics of the A, B, C, and BX registers are described in detail in said copending McGovern et al. application.

The subtract iteration, utilized in division as set forth hereinbefore, comprises complement addition as is well-known in the art. In order to achieve complement addition the divisor is placed in the A register and the dividend is placed in the B and BX registers; if the sign of the dividend is the same as the sign of the divisor, the content of the A register is complemented by inverting it within the A register (in response to the aforementioned inversion characteristic thereof), and providing the carry look ahead mechanism with a "Hot one," or carry in, applied at the low order input thereto. The combination of inverting and adding a "Hot one" to the carry look ahead has the effect of two's complementing the contents of the A register to the two's complement form as described hereinbefore, insofar as addition to the B register is concerned. Next B is set into C. Thereafter, the divisor is transferred into the B and C registers simultaneously through the funnel 26. Since these registers form the EXCLUSIVE OR of the data manifestations from the funnel 26 with data manifestations set therein, the half sum of the divisor and dividend is formed in both B and C registers. The carry look ahead **32*a* then develops appropriate carries in response to the A and C registers. Then the carry look ahead output is transferred through the funnel 26 into the B register so as to form a final sum, thus completing the first divide iteration. This is defined as the divide add time. Thereafter, if the divisor is to be complemented (as following an overdraw) it is then inverted and a "Hot one" is supplied to the carry look ahead mechanism whenever the divisor is inverted from its original form so as to provide the two's complement of the divisor. The C register is set by the B register, so it also contains the remainder. Then the content of the A register is transferred again through the funnel to the B register 32 and C register 30 so as to form the half sum (in these D registers) of the current divisor with the current remainder. The carry look ahead mechanism (which responds to the divisor plus the half sum of the divisor and the remainder) will generate carries which are transferred through the funnel 26 to the B register 32 so as to provide a final sum. The CLA also provides the "Hot one" to complete the two's complement of A at the same time. If a carry out is indicated, it is provided by the carry look ahead mechanism 32*a***. This carry out is the carry which is monitored to determine when the A register is to be complemented, and to determine when a quotient bit is to be developed. Any quotient bit developed is inserted into the right hand (low order) end of the BX register.

The circuitry necessary for incorporating the present invention in such an environment includes a zero detector 50 for determining when the output of the B register is all zeros, a possible zero remainder latch 52 which is set by the zero detector, and a connection from the high order end of the BX register 33 to the possible zero remainder latch 52 so that the presence of a non-zero bit in this high order end will reset the possible zero remainder latch. Additional circuitry, utilized for performing non-restoring binary division, includes a divisor sign control 54 to manifest the sign of the original divisor, a dividend sign control 56 which maintains a setting of the dividend sign, a quotient sign control 58 which causes the quotient sign to be positive when divisor and dividend are alike and to be negative when the divisor and dividend have opposite signs, and a quotient generator 60 which is responsive to the dividend sign and to carries to generate quotient bits whenever the operation has reduced the remainder with the result that it has the same sign as the dividend, as described hereinbefore. A "carry in" control 62 controls the carry look ahead circuitry **32*a* and provides "Hot ones" for complementing and for correcting quotients which result from zero remainders associated with negative dividends as described hereinbefore. Complementing of the divisor when necessary is controlled by a divisor complementing circuit 64**.

In association with the timing and data flow control circuitry 36, 38 there is provided a shift counter 66 which may be of any well-known type, examples of which are illustrated in the aforementioned copending applications of Amdahl et al. and MacSorley et al. The shift counter operates in a well-known fashion to keep track of the number of iterations in the divide cycle. In the five character example given in the tables hereinbefore, the shift counter would initially be set to six so that at the start of each cycle it may be decremented until it reaches zero. Thus at the start of the very first divide operation the shift counter would be set to 5 indicating the first divide iteration which, as described hereinbefore, is a test cycle to determine that the divisor bears a correct relationship to the dividend. The timing of the system includes commencing of the divide operation, counting the number of iterations, by means of a shift counter, and when the shift counter reaches zero having additional cycles as necessary for remainder correction, quotient correction, and complementing of the quotient when required. Since the exact nature of the shift counter and controls therefore, the timing, op decoding and addressing, and data flow controls depend upon the particular environment within which the present invention is to be embodied, and since the environment is immaterial to the uasage of the invention, details of these circuits have been reduced to an absolute minimum to illustrate the manner in which the various significant occurrances may be manifested and utilized so as to achieve negative dividend division without complementing of the dividend in accordance with the present invention.

During a divide set up time, after the dividend and divisor are set into appropriate registers as described hereinbefore, the signs thereof are manifested in the sign controls 54, 56; from these, the quotient sign may be manifested; the quotient sign is used, as described hereinbefore, to pass the quotient as developed, or to complement it, in dependence upon whether the quotient is to be expressed in its true or complement form (depending upon whether the signs of the divisor and the dividend are alike or unlike, respectively). The dividend sign is also compared with carries developed by the carry look ahead mechanism **32*a* during each divide operation iteration so as to provide a quotient of one if there is no carry when a negative dividend is involved and if there is a carry when a positive dividend is involved. The zero detector 50 continuously monitors the output of the B register, and if the B register goes to all zeros at the appropriate point in a divide iteration cycle, the zero detector will set the possible zero remainder latch 52 (PZR LCH) so as to remember that an all zero condition was sensed in at least a portion of the remainder. The possible zero remainder latch 52** will remain set unless a one is sensed in the high order bit of the BX register, indicating that the remainder was not in fact all zeros, there being some low order ones yet to be utilized therein at the time that the possible all zero condition is sensed.

In a 32 bit data flow as illustrated in the exemplary environment of FIG. 1, a shift counter may normally be set to a value of 33 so as to provide 33 divide iterations (after being decremented at the start of the first cycle), one for each bit of the data flow and one to test for the correct relative magnitude of dividend and divisor. An additional test may take place on the second cycle if required.

In order to complement the quotient when required (negative dividend with positive divisor or positive dividend with negative divisor), the B and BX registers are interchanged, the C register is set with the content of the B register, and a field of all ones are passed from the STRAIGHT/CROSS circuit 24 through the funnel 26 into the B register 32 and C register 30 so as to invert every position of these registers. The A register is reset; then the C register develops carries in the carry look ahead mechanism **32*a* with a "Hot one" from the carry in circuit 62 so as to complete the two's complement thereof, by passing the carries through the funnel 26 to the B register 32**, where the EXCLUSIVE OR function of these carries is formed with the inverted quotient, so as to complete the two's complement of the quotient.

Figure 3:
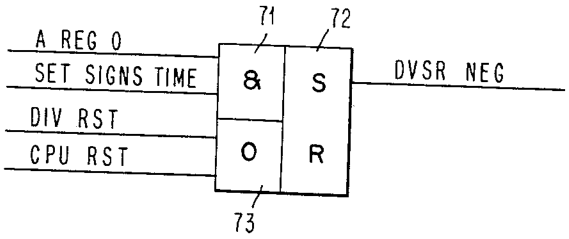
FIG. 3 is a simplified schematic block diagram of divisor sign circuitry for use in the embodiment of FIG. 1.

Referring now to FIG. 3, the divisor sign latch monitors the high order bit of the A register so as to determine the sign of the original divisor. This is in accordance with the architectural definition of a system set forth in said copending applications of Amdahl et al. and of MacSorley et al., wherein the highest order position of an integer is the sign of the integer. Thus an AND circuit 71 will cause the setting of a latch 72 in response to a bit in bit position zero (the highest ordered bit position) of the A register at an appropriate time for setting the signs, as described hereinafter, due to a SET SIGNS TIME signal. The latch 72 is reset by an OR circuit 73 at the end of a divide operation in response to a divide reset signal or whenever the computer is reset in response to a CPU reset signal. The output of the latch 72 is a signal indicating that the divisor is negative.

Figure 4:
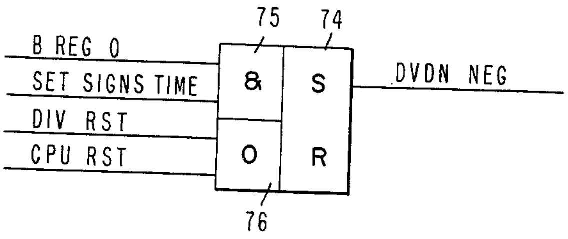
FIG. 4 is a simplified schematic block diagram of dividend sign circuitry for use in the embodiment of FIG. 1.

In FIG. 4, a latch 74 set by an AND circuit 75 and reset by an OR circuit 76 in the same manner as in the circuitry of FIG. 3 with the exception of the fact that the high order position (bit 0) of the B register is monitored, so that if there is a one therein, the AND circuit 75 will cause the setting of the latch 74, thus to indicate a negative dividend.

Figure 5:
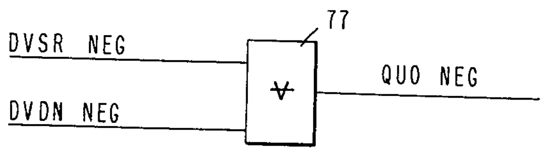
FIG. 5 is a simplified schematic block diagram of quotient sign circuitry for use in the embodiment of FIG. 1.

In FIG. 5, an EXCLUSIVE OR circuit 77 is responsive to the output of the latch 72 in FIG. 3 and the output of the latch 74 in FIG. 4 so that if either the divisor or the dividend is negative, but not both, then the EXCLUSIVE OR circuit 77 will generate a signal indicating that a negative quotient is required. If both are negative or if both are positive, the EXCLUSIVE OR circuit 77 will have no output therefrom. The quotient negative signal indicates that the final quotient is to be complemented. This is due to the fact (as illustrated in the Tables 11–14) that the quotient is always developed in true form. However, when the dividend and divisor have opposite signs, a negative quotient is to be supplied, so that the developed quotient has to be complemented, according to the first rule hereinbefore.

Figure 6:
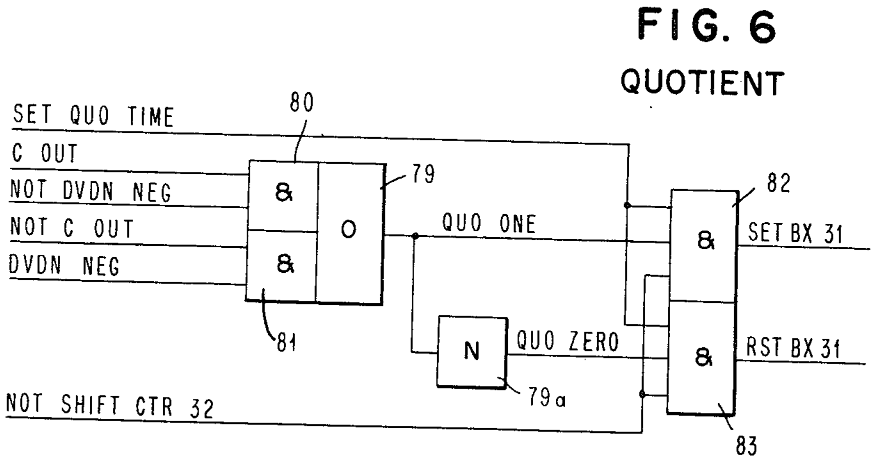
FIG. 6 is a simplified schematic block diagram of a quotient generator for use in the embodiment of FIG. 1.

In FIG. 6, a quotient bit for insertion in the low order end of the BX register is developed by an OR circuit 79 in response to either one of two AND circuits 80, 81. The AND circuit 80 is operative in response to a carry out of the carry look ahead mechanism during divide operations with a positive dividend, and the AND circuit 81 is responsive to a lack of the carry during divide operations with a negative dividend. This is in accordance with the fourth rule given hereinbefore, and illustrated in Tables 11–14. Through an inverter **79*a*, the lack of a quotient one will cause a quotient zero. The quotient one and quotient zero signals are applied to respective AND circuits 82, 83 so as to be gated with appropriate timing, indicated as "set quotient time," thus to develop signals to either set or reset the lowest ordered position (position 31) of the BX register. This is because of the fact that, as is common in the data processing art, the quotient is developed one bit at a time by having quotient bits inserted in the low order position of the register which originally contains the low order half of the dividend, and these bits are shifted along with the dividend one bit to the left for each divide iteration so as to make room for the next quotient bit and concurrently provide higher order designations for the respective bits of the dividend and the remainder. The quotient is blocked during the test cycle by the absence of a NOT SHFT CTR 32** signal.

Figure 7:
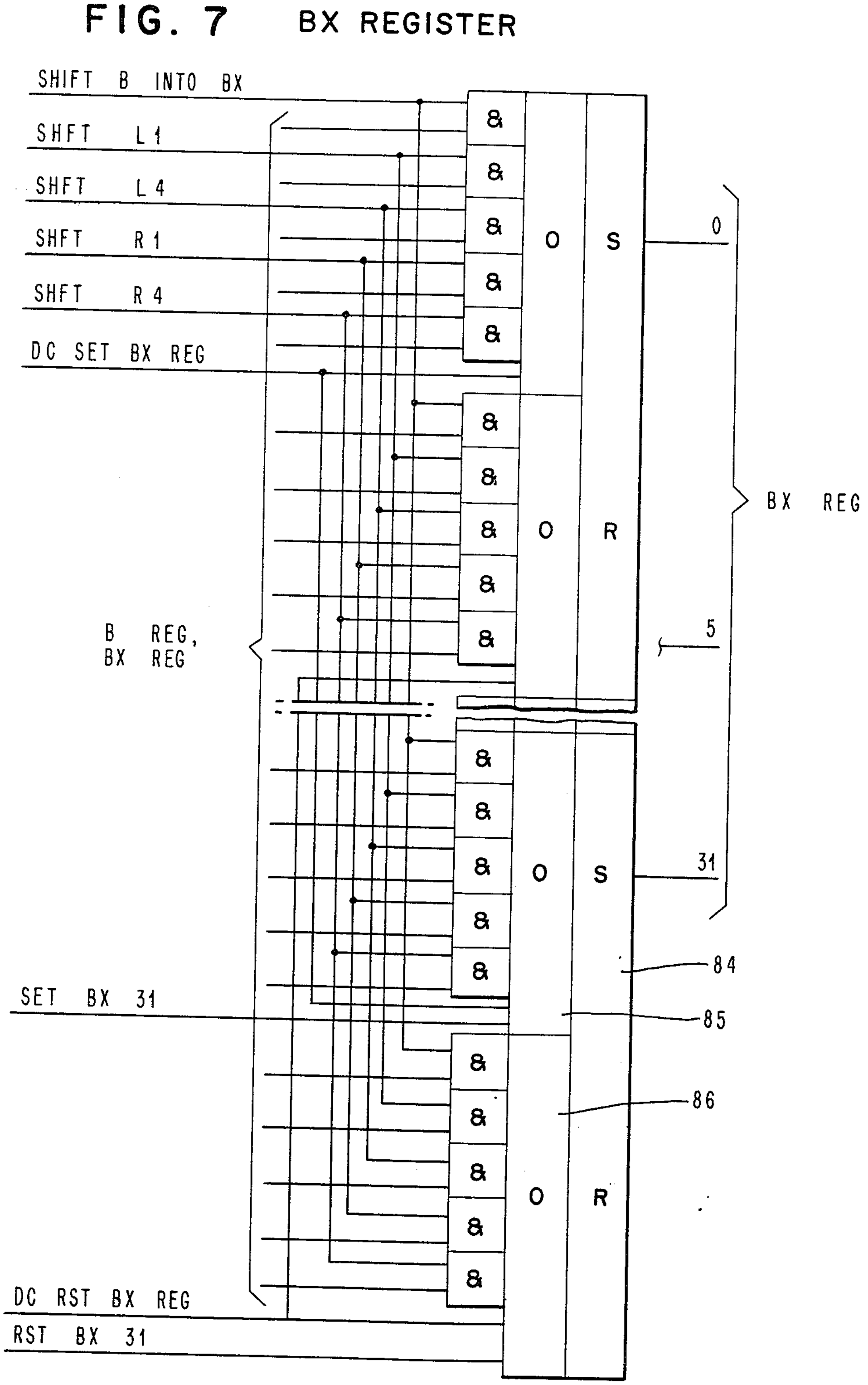
FIG. 7 is a simplified schematic block diagram of a BX register for use in the embodiment of FIG. 1.

The set and reset signals generated in FIG. 6 are applied to a corresponding pair of OR circuits 85, 86 illustrated in FIG. 7. These are used to respectively set or reset the lowest order position of the BX register, which comprises a latch 84. The BX register illustrated in FIG. 7 herein is identical to the BX register shown in FIG. 9 of said copending application of McGovern et al., with the exception of the SET BX 31 and RESET BX 31 signals, which are not shown in FIG. 9 of said copending application.

Figure 8:
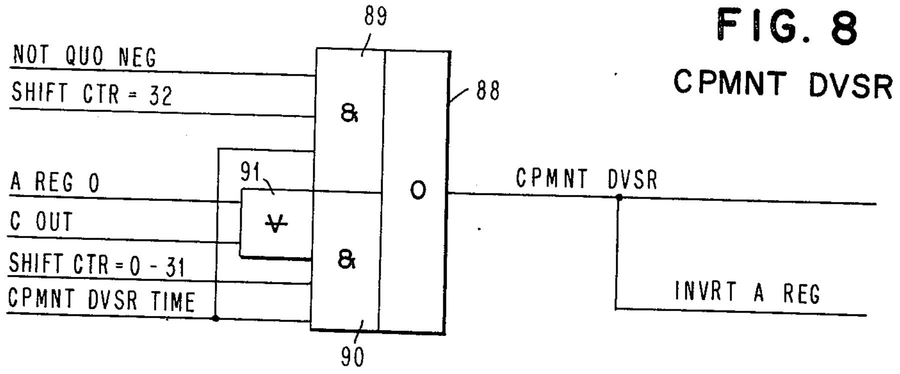
FIG. 8 is a simplified schematic block diagram of divisor complementing control circuitry for use in the embodiment of FIG. 1.

In FIG. 8, the fact that the divisor has to be complemented is manifested by a signal generated by an OR circuit 88 in response to either one of two AND circuits 89, 90. The AND circuit 89 is responsive during the first divide iteration, which is indicated herein by a shift counter setting of 32. The AND circuit 89 senses the case when a positive quotient is involved, which means that the signs are alike, and that therefore the divisor is to be complemented before the first divide iteration, as described hereinbefore. The AND circuit 90 is responsive during each iteration when the shift counter stands between 0 and 31 to pass the signal to the OR circuit 88 whenever there is an output from an EXCLUSIVE OR circuit 91. The EXCLUSIVE OR circuit 91 monitors the sign of the divisor by looking for a one bit in the high order position of the A register. When the A register is negative, there will be a one in bit position 0 thereof. If this is accompanied with a carry out, then there is no complementing of the divisor as described hereinbefore, and there will be no output from the EXCLUSIVE OR circuit 91. However, whenever the A register is positive, as indicated by *no* signal coming from A register bit position 0 and there is a carry out, then the EXCLUSIVE OR circuit 91 will pass a signal through the OR circuit 88; similarly, if there is no carry but there is a one in the high order position of the A register, the EXCLUSIVE OR circuit 91 will pass a signal through the OR circuit 88.

The carry look ahead mechanism **32*a* is responsive to the carry in circuit generated in FIG. 9. The carry in circuit represents the generation of a signal which is described hereinbefore as a "Hot one" and is used to form the two's complement from the one's complement. The one's complement is a straight bit-by-bit inversion of the integer; the two's complement is formed by adding a one to the one's complement, as described hereinbefore. The carry in signal which is applied to the carry look ahead 32*a* is generated in FIG. 9 by an OR circuit 92 in response to any one of five AND circuits 93*a*, 93*b* and 94–96. The AND circuit 96 is illustrative merely of the fact that other controls could also cause generation of the carry in signal by the OR circuit 92. The AND circuits 93*b* and 93*a* operate when the divisor is to be complemented, during any divide add time. The AND circuit 94 operates when the quotient is to be complemented, and the AND circuit 95 operates when a zero remainder indicates that the quotient is to be corrected by having a one added thereto. The AND circuit 94 is blocked from operating when the possible zero remainder latch is set since complementing the quotient and then adding a one thereto is equivalent to merely inverting the quotient. Thus when both complementing of the quotient and correcting it are to be achieved, the quotient is merely inverted. The AND circuit 95** is similarly inhibited whenever the quotient is to be complemented. Thus a carry in is generated for quotient complementing when zero remainder quotient correction is not required, or for quotient correction when complementing is not required.

FIG. 10 is a simplified illustration of a zero detector suitable for determining when the B register represents all zeros. An OR circuit 97 is responsive to a bit in any position of the B register, and this feeds an inverter 98 which will indicate the B register to be all zeros except when it has an input from the OR circuit 97.

FIG. 11 is a simple illustration of an exemplary possible zero remainder latch 99 in accordance with the present invention. The latch is set any time the B register is all zero, provided it is an appropriate time within a divide iteration as indicated by a signal on a SET PZR TIME line. This is achieved by an AND circuit 100. The possible zero remainder latch 99 is reset by an OR circuit 102 at the end of a divide operation or when the CPU is being reset, or in response to an AND circuit 103. The AND circuit 103 senses a one in the high order position of the BX register (position 0), so that at an appropriate time, the AND circuit 103 can cause the OR circuit 102 to reset the possible zero remainder latch 99. Thus it can be seen that once an all zero remainder is detected, the latch is set. If a one bit is present in some portion of the dividend which is not yet shifted into the remainder, eventually that bit will appear in position 31 of the BX register as the remainder and portions of the dividend are shifted left, and this will cause resetting of the latch 99. Within the same divide operations it is possible that a second possible zero remainder may be sensed by an all zero condition in the B register. If this occurs, the latch will again be set. It may thereafter remain set or again be reset by a one sensed in the high order position of the BX register. The only significant thing is, if at the end of the divide operation the possible zero remainder latch 99 is still set, then this indicates there was an all zero remainder at one time, and the quotient must be corrected by being incremented by a value of one, as described hereinbefore. The AND circuit 103 is blocked after the shift counter reaches zero so that a quotient bit shifted into the highest order of BX will not reset the PZR latch.

The PZR LCH output in FIG. 11 is applied to an AND circuit 106 so as to DC reset the B register (see FIGS. 7–9 of said McGovern et al. application) in any remainder correction cycle of a negative dividend operation when a zero remainder has resulted. This is necessary because if there is a zero remainder in a negative dividend operation, quotient bits are generated on all successive cycles, including cycle 0. This falsely causes the circuitry to assume a successful reduction in cycle zero, so that no correction of the remainder will result when in fact the remainder should be corrected to all zeros. If the all zero result is achieved in cycle zero, a false lack of a quotient will indicate that remainder correction is needed, when it is not. Thus, the all zero result will be changed, so it must be forced into the B register.

Timing of the divide operation begins with the loading of the A, B, and BX registers. During this time, the shift counter may be set to its initial setting, which is one count higher than the number of quotient bits which are to be developed (33 in the case of a 32 bit data flow). After the A, B, and BX registers are loaded, the divisor and dividend sign latches are set (SET SIGNS TIME signal, FIGS. 3 and 4). This completes the set-up operation, following which the actual divide iterations will occur.

Each divide iteration includes several functions bearing relative timing as described below. First, the shaft counter is decremented by a value of one. Then B and BX are shifted left one order (SHFT L1 signal in FIGS. 7–9 of said copending McGovern et al. application); since this should not occur during the test cycle, it would be blocked by a shift counter value of 32. Then B is set into C. Next, the tests are performed to determine if the divisor is to be complemented (CPMNT DVSR signal, FIG. 8). Then the actual arithmetic operation described with respect to FIG. 1 hereinbefore is performed (DIV ADD signal, FIG. 9); this includes the functions in the order described hereinbefore. Following the arithmetic operation, the possible zero remainder latch will be set if the zero detector so indicates (SET PZR signal, FIG. 11). Next the quotient bit is set (SET QUO TIME signal, FIG. 6), except during the test cycle (NOT SHFT CTR 32 signal, FIG. 6). Next, the PZR may be reset if there is a binary one in bit 0 of the BX register (RESET PZR TIME signal, FIG. 11), except during the last iteration, in which a quotient bit may appear in position 0 of the BX register (NOT SHFT CTR 0 signal, FIG. 11). This divide iteration is repeated through a cycle in which the shift counter is stepped to a zero setting.

The cycle following the setting of the shift counter to zero is the remainder correction cycle. This cycle includes, first, the complement divisor time and then the divide add time (as described relative to the divide iteration in the preceding paragraph). But if the PZR latch is on, the B register is DC reset because the remainder should be zero, but no proper correction takes place due to the erroneous quotient bit generated in cycle 0.

After the remainder correction cycle, the quotient is corrected and/or complemented. This is done in a cycle which includes a swap of B and BX (SHFT B 32 signal, FIGS. 7–9 of said McGovern et al. application), and the A register is reset. Then B is set into C. After that, if the quotient should be negative, B and C are inverted by gating the STRAIGHT/CROSS through the FUNNEL (see said McGovern application), so as to EXCLUSIVE OR an all one field into these registers. The CARRY IN to the CLA is generated (CORRECT QUO TIME signal, FIG. 9) if the quotient is to be complemented or corrected for zero remainder, but not if both are being done. The CLA is then gated through the FUNNEL to the B register so as to provide the final quotient. This leaves the quotient in B and the remainder in BX; what is done with these results is not germane to the present invention.

Thus there has been described apparatus which permits dividing a negative dividend without forming the two's complement thereof. There is also shown means for correcting a quotient which may be erroneously developed due to an all zero remainder giving a faulty indication of an overdraw or a nonsuccessful restore, together with simple zero detecting apparatus which avoids necessity of keeping track of the number of quotient bits in a register in order to determine whether the remainder (including unused portions of the dividend) is all zeros. There is thus also described apparatus for combining the correction of a quotient (as a result of a zero remainder associated with a negative dividend) with the complementing of a positively-developed quotient which must be expressed in negative form. The apparatus herein is relatively simple, and may be implemented in a variety of forms so as to be utilized with any sort of iterative binary dividing apparatus.

Although the invention has been shown and described with respect to a preferred embodiment thereof, it should be understood by those skilled in the art that various changes in form and detail may be made therein without departing from the spirit and scope of the invention, which is to be limited only as set forth in the following claims.

What is claimed is:

1. In a data processing system capable of performing binary division by successive additions of a divisor of a given number of orders to an equal number of successively lower ordered orders of a dividend and remainder, the divisor and dividend being represented by manifestations in true binary notation or in two's complement notation in dependence upon whether they are positive or negative integers, respectively, the manifestations of said divisor and said dividend including sign manifestations to indicate the sense thereof, the sign manifestation of a zero being indicated in a positive sense, the combination comprising:

negative dividend means for sensing the presence of a negative dividend;

zero remainder means for sensing the presence of a zero remainder; and means connected to said negative dividend means and to said zero remainder means and being responsive thereto for generating a quotient correction signal when a zero remainder occurs in conjunction with a negative dividend.

2. The invention described in claim 1 additionally comprising:

quotient generating means for developing the quotient during the division;

register means responsive to said quotient generating means for manifesting the quotient developed by said quotient generating means; and arithmetic means responsive to said quotient correcting signal to increment the quotient in said register means by a value of one.

3. The invention described in claim 1 wherein said zero remainder means comprises a zero detector and a latch responsive thereto, said latch being set in response to said zero detector detecting all zeros.

4. The invention described in claim 3 wherein said zero detector is responsive to less than all of the orders of said remainder, and including means responsive to the shifting of a non zero digit from an undetecting portion of said remainder into the detected portion of said remainder for resetting said latch.

References Cited

UNITED STATES PATENTS

| | | | |
|---|---|---|---|
| 3,378,677 | 4/1968 | Waldecker et al. | 235—164 |
| 3,229,079 | 1/1966 | Zink | 235—164 |

OTHER REFERENCES

Ivan Flores: The Logic of Computer Arithmetic, 1963, pp. 64–68.

Yaohan Chu: Digital Computer Design Fundamentals, 1962, pp. 39–42.

MALCOLM A. MORRISON, Primary Examiner

DAVID H. MALZAHN, Assistant Examiner